(12) United States Patent
Barton et al.

(10) Patent No.: US 7,227,834 B1
(45) Date of Patent: Jun. 5, 2007

(54) SYNCHRONIZING PULSE GENERATING METHOD AND METHOD OF RECEIVING OFDM SIGNAL

(75) Inventors: Stephen K. Barton, Surrey (GB); Stephen M. Brunt, Surrey (GB); Javier Echavarri, Surrey (GB); John Orriss, Surrey (GB)

(73) Assignee: Mitsubishi Kabushiki Kaisha, Tokyo (JP)

( * ) Notice: Subject to any disclaimer, the term of this patent is extended or adjusted under 35 U.S.C. 154(b) by 902 days.

(21) Appl. No.: 09/807,959

(22) PCT Filed: Aug. 24, 2000

(86) PCT No.: PCT/JP00/05704

§ 371 (c)(1),
(2), (4) Date: Jun. 14, 2001

(87) PCT Pub. No.: WO01/17150

PCT Pub. Date: Mar. 8, 2001

(30) Foreign Application Priority Data

Aug. 27, 1999 (GB) .................................. 9920447.1

(51) Int. Cl.
*H04J 11/00* (2006.01)
*H04J 3/06* (2006.01)
*H04L 3/06* (2006.01)

(52) U.S. Cl. ...................... 370/208; 370/203; 370/350; 370/503

(58) Field of Classification Search ........ 370/203–204, 370/206–208, 210, 252, 343, 350, 470, 478, 370/480, 482, 503, 504, 509, 519, 520, 528; 375/116, 129, 131, 141, 147, 150, 219, 220, 375/267, 298, 341, 343, 354–376
See application file for complete search history.

(56) References Cited

U.S. PATENT DOCUMENTS

| | | | |
|---|---|---|---|
| 5,602,835 A * | 2/1997 | Seki et al. .................. | 370/206 |
| 5,818,813 A * | 10/1998 | Saito et al. ................. | 370/208 |
| 5,889,759 A | 3/1999 | McGibney | |
| 6,108,353 A * | 8/2000 | Nakamura et al. .......... | 370/504 |

(Continued)

FOREIGN PATENT DOCUMENTS

EP 0 689 313 12/1995

(Continued)

OTHER PUBLICATIONS

A. Palin, et al., Global Telecommunications Conference, vol. 5, pp. 2788-2793, "Enhanced Symbol Synchronization Method for OFDM System in SFN Channels", Nov. 8, 1998.

*Primary Examiner*—Chirag G. Shah
(74) *Attorney, Agent, or Firm*—Oblon, Spivak, McClelland, Maier & Neustadt, P.C.

(57) ABSTRACT

In an OFDM receiver, a synchronisation pulse for defining a Fast Fourier Transform window is generated by examining the output of a correlator to find a sub-interval within which there is maximum correlation between samples of the symbol separated by the length of the useful part of the symbol. The synchronisation pulse is generated during this sub-interval (102). Adjustments to the timing of the synchronisation pulse are made only if the current error is significant and persistent. A signal representing the amount of adjustment is used to determine phase rotations applied to the output of the FFT circuit.

25 Claims, 6 Drawing Sheets

U.S. PATENT DOCUMENTS

| | | | |
|---|---|---|---|
| 6,456,649 B1 * | 9/2002 | Isaksson et al. | 375/222 |
| 6,470,030 B1 * | 10/2002 | Park et al. | 370/480 |
| 6,563,896 B1 * | 5/2003 | Nomura et al. | 375/364 |
| 6,628,730 B1 * | 9/2003 | Stott et al. | 375/344 |

FOREIGN PATENT DOCUMENTS

| | | |
|---|---|---|
| EP | 0 730 357 | 9/1996 |
| EP | 0 798 903 | 10/1997 |
| EP | 0 837 582 | 4/1998 |
| EP | 0 854 620 | 7/1998 |
| EP | 0854620 A2 * | 7/1998 |
| EP | 0 881 804 | 12/1998 |
| EP | 0 915 597 | 5/1999 |
| EP | 0 955 754 | 11/1999 |
| EP | 0 998 068 | 5/2000 |
| EP | 1 041 790 | 10/2000 |
| EP | 1 063 824 | 12/2000 |
| EP | 1 172 956 | 1/2002 |
| GB | 2 306 084 | 4/1997 |
| GB | 2 307 155 | 5/1997 |
| GB | 2 361 157 | 10/2001 |
| JP | 10-190610 | 7/1998 |
| JP | 10-308716 | 11/1998 |
| WO | WO 99/12305 | 3/1999 |

* cited by examiner

FIG.1

Background Art

FIG.2

Background Art

FIG.3

Background Art

| $N_S$ | L1 | L2 |
|---|---|---|
| 1 | 64 | 4 |
| 2 | 32 | 8 |
| 3 | 21 | 12 |
| 4 | 16 | 16 |
| 5 | 13 | 20 |
| 6 | 11 | 24 |
| 7 | 9 | 28 |
| 8 | 8 | 32 |

SYNCHRONIZING PULSE GENERATING METHOD AND METHOD OF RECEIVING OFDM SIGNAL

TECHNICAL FIELD

This invention relates to OFDM modulation. It is particularly concerned with the generation of a synchronisation pulse representing an OFDM symbol boundary, for example for use in Fourier Transform demodulation.

BACKGROUND ART

OFDM systems are well known. Various techniques have been used for synchronisation of OFDM receivers. Some of these techniques require transmission of a special synchronisation signal. Other techniques rely on a standard OFDM signal, in which a complete symbol comprises a "useful part" and a "guard space", the guard space sometimes being referred to as a guard interval, cyclic extension or cyclic prefix.

The guard space precedes the useful part of the symbol and contains a repeat of the data at the end of the useful part. (This is equivalent to having a guard space after the useful part, containing data which is the same as that at the beginning of the useful part.)

Synchronisation techniques which rely upon the duplicated data in the guard space generally operate by performing a cross correlation between complex samples spaced apart by the length of the useful part of the symbol. This generates a timing pulse which is used in Fourier Transformation of the received signal. The timing of the pulse is such that the Fourier Transform window contains only data from a single symbol.

If the timing is incorrect, inter-symbol-interference (ISI) occurs. However, the use of the guard space allows a certain amount of variation in the timing of the pulse while still avoiding ISI. The guard space should be longer than the longest expected spread of delays amongst signals received via different paths. The guard space is relatively small compared with the useful part of the signal; typically, the guard space may contain Nu/32, Nu/16, Nu/8 or Nu/4 samples, where Nu is the number of samples in the useful part of the symbol.

Various techniques exist for deriving the synchronisation pulse from the cross-correlation. Although these operate adequately in common reception conditions, there are circumstances in which the timing pulse is generated at an undesirable point, leading to ISI.

The cross-correlator, in the absence of noise or multi-path interference, produces an output which averages to zero except during the time that the guard space samples are cross correlated with the samples, in the useful part of the symbol, which are of equal value. During that period, the cross-correlator produces a high-level output. This high-level output terminates at the end of one symbol and the beginning of the next. One prior art arrangement integrates the output of the correlator, and then peak-detects the resultant signal to produce a timing pulse at the end of each symbol.

In the case of multi-path interference, wherein the same signal is received via different delays, in order to avoid ISI, the synchronisation pulse should be generated during a window which has a width equal to the overlap between the guard spaces of the two received signals. However, the cross-correlator will produce a significant output throughout the period in which samples of either one or both of the guard space samples are being processed by the cross-correlator. In some circumstances, this will result in the timing pulse being provided outside the optimum window, thus resulting in ISI.

EP-A-0 772 332 describes other techniques for generating a synchronisation pulse. One such disclosed technique relies upon feeding the output of the correlator to a phase locked loop (PLL). This can also result in the synchronisation pulse being generated outside the optimum window in the case of significant noise or multi-path interference. Furthermore, a PLL requires a substantial number of symbol periods in order to achieve lock, which therefore results in substantial acquisition time.

A further problem which can arise in prior art arrangements results from the fact that, when the synchronisation pulse is adjusted as a result of, for example, changing signal conditions, the complex values in the frequency bins at the output of the FFT suffer varying degrees of phase rotation. Although a subsequent channel estimator and corrector can handle these changes, this can result in a further increase of acquisition time and requires a significant amount of processing power.

It would therefore be desirable to provide a technique for generating a synchronisation pulse in which these problems are avoided or at least mitigated.

DISCLOSURE OF INVENTION

Aspects of the present invention are set out in the accompanying claims.

Namely, this invention is a method of generating a synchronisation pulse representing a symbol boundary in an OFDM signal comprising useful symbol periods separated by guard spaces, with data in each guard space corresponding to part of the data in a respective useful period, the method comprising a step of providing a signal representing the degree of correlation between samples of a received signal which are separated by a period corresponding to the useful part of the symbol, the signal thus providing an output representing for each symbol an interval during which significant correlation is found, and a step of determining a sub-interval within which a maximum degree of correlation occurs and arranging for the synchronisation pulse to be provided within this sub-interval.

According to a further aspect, a synchronisation pulse is generated by providing a signal representing the degree of correlation between samples of a received signal which are separated by a period corresponding to the useful part of the symbol, the signal thus providing an output representing an interval during which significant correlation is found, the method comprising the step of determining a sub-interval within which a maximum degree of correlation occurs, and arranging for the synchronisation pulse to be provided within this sub-interval.

In the case of multi-path interference, it is found that the degree of correlation is at a maximum throughout a period whose width corresponds to the overlap of the guard spaces. This is an optimum period for generation of the synchronisation pulse, because this will ensure that each Fourier Transform window contains samples from only one symbol, even though the same symbol is received with different delays. Using the techniques of the present invention, the output of the cross-correlator is examined to determine when this optimum period occurs.

In a preferred embodiment, the output of the cross-correlator is compared with a threshold, and the optimum sub-interval defining the period in which the synchronisation pulse is to be generated is represented by the period during which the cross-correlator output exceeds this threshold. Preferably, the threshold is varied in dependence upon the output of the cross-correlator, and more preferably the threshold is based upon the maximum level of the correlator output.

The use of a threshold is regarded to be an independently inventive aspect of the invention. According to this further aspect, the output of a correlator which represents the degree of correlation between samples of a received signal which are separated by a predetermined number of sample intervals is applied to a level detector, and only those parts of the signal which exceed a predetermined (preferably variable) level are taken into account in determining the time-at which a synchronisation pulse should be generated.

If desired, the timing pulse could be generated at any time during the window which represents maximum correlation, for example at the middle of this window. As the signal conditions vary, this point may shift, in which case the synchronisation pulse will alter accordingly. In the preferred embodiment, however, the timing of the synchronisation pulse is altered only if certain conditions are met. For example, the timing can be altered only if the current timing is found to be in error a predetermined number of times, and/or only if the current error exceeds a predetermined amount. This technique, which is regarded to be an independently inventive aspect, avoids excessive numbers of changes in the timing of the Fourier Transform operation, each of which would cause a phase rotation of each of the carriers at the output of the FFT by a different angle, which would place a heavy workload on the channel estimator conventionally provided.

According to a still further aspect of the invention, there is provided at the output of the FFT means for imparting different phase rotations to the respective samples of the FFT output, this means being responsive to a signal representing the amount of shift imparted to a synchronisation pulse by a pulse generator for determining the amount of phase rotation applied. This allows very rapid, and indeed possibly instantaneous, compensation for changes in the timing of the synchronisation pulse. The phase rotations may be imparted by a circuit positioned between the FFT and the channel estimator and corrector, or alternatively the channel estimator and corrector can perform the phase rotation. Preferably, changes in the timing of the synchronisation pulse are arranged to occur relatively infrequently (according to the aspect of the invention mentioned previously), and preferably only, or normally, in predefined amounts. This facilitates the determination of the appropriate phase rotations to be applied to the FFT outputs. These phase rotations can be calculated in response to a signal representing an actual or prospective degree of shift in the timing of the synchronisation pulse, or alternatively could be derived from a look-up table addressed in accordance with such a signal.

In the prior art mentioned above, the output of the correlator is filtered, for example by using a sliding-window averager which sums the most recent Ng samples from the cross-correlator. This filtering technique would, however, vary the shape of the correlator output, and accordingly, in the preferred embodiment of the present invention, the cross-correlator output is filtered by summing the most recent L1 samples, where L1 is significantly smaller than Ng.

It is known in the prior art to take the output of the sliding-window averager and process this to provide a signal used in fine frequency correction. This technique is preferably also used in arrangements according to the present invention. However, to obtain better quality of fine frequency estimation, in the preferred embodiment of the present invention, a second filter is applied to the output of the first filter, and produces an output which represents averaging over a number of samples which is substantially greater than L1. For example, the output may be equivalent to what would be obtained from a single filter summing the latest Ng samples.

BEST MODE FOR CARRYING OUT THE INVENTION

Figure 1:
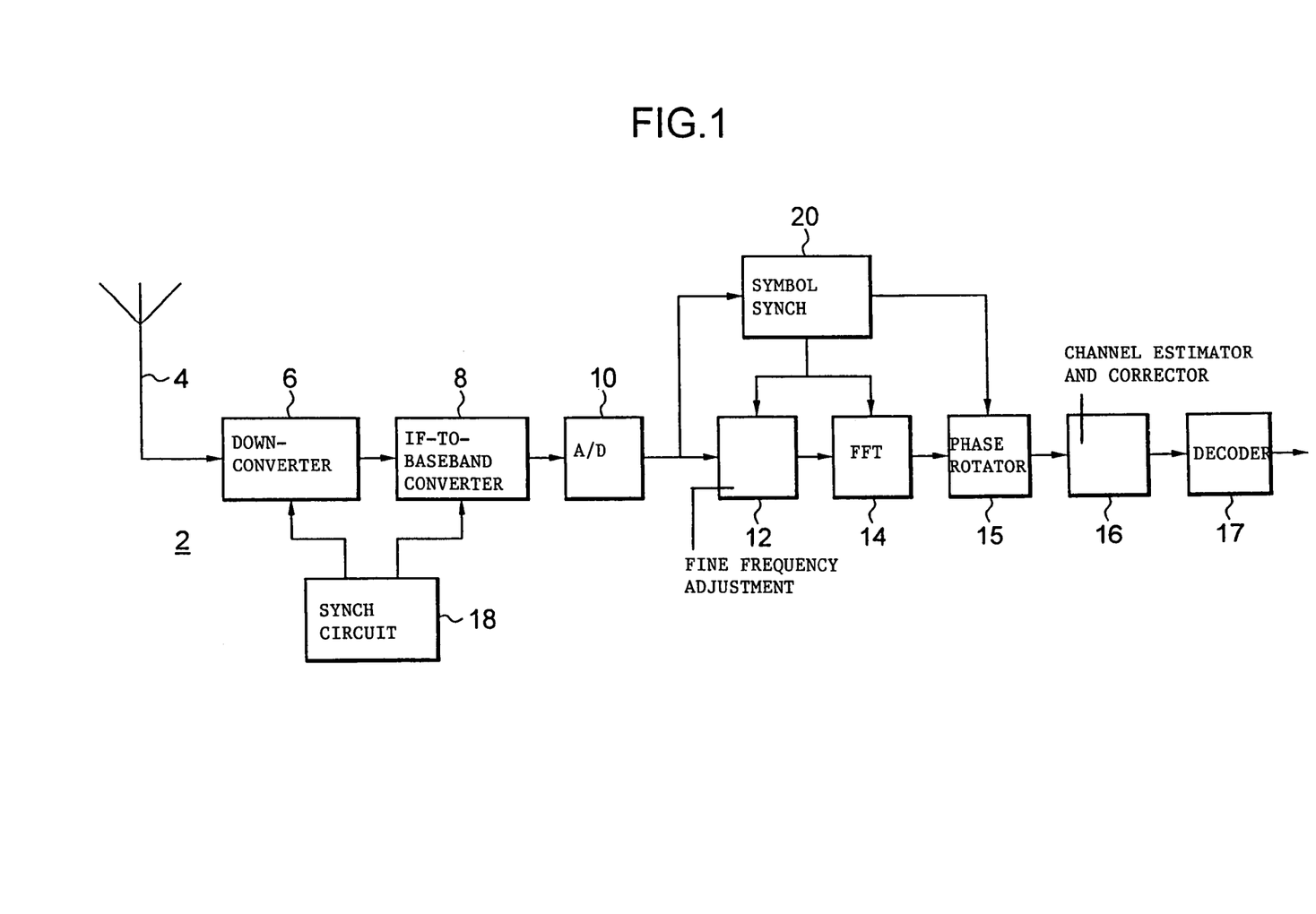
FIG. 1 is a block diagram of an OFDM receiver in accordance with the present invention.

Referring to FIG. 1, an OFDM receiver 2 comprises an antenna 4 which receives a signal and presents it to a down-converter 6 which converts the RF signal to an IF signal. This is then converted into a baseband signal by an IF-to-baseband converter 8. This produces at its output complex samples of each transmitted OFDM symbol. These complex samples are digitised by an analog-to-digital (A/D) converter 10, and delivered via a fine frequency adjustment circuit 12 to a Fast Fourier Transform (FFT) circuit 14. The FFT circuit 14 converts the samples from the time domain to the frequency domain, and the symbol data at the output is provided to a phase rotator 15, a channel estimator and corrector 16 and a decoder 17.

The techniques of the present invention facilitate the provision of a feed-forward system, which doesn't rely on feedback or phase locked loops (PLL's) for adjusting the local oscillator frequencies. However, it would be possible in an alternative arrangement if desired to provide such feedback, so that the synchronisation circuit 18 would be responsive to, for example, the complex samples from the A/D converter 10 and and/or a signal from the channel estimator and corrector 16.

The complex samples are delivered to a symbol synchronisation circuit 20, which generates a frequency offset signal for the fine frequency adjustment circuit 12, and a synchronisation pulse for use by the Fast Fourier Transform (FFT) circuit 14. The FFT circuit 14 requires the synchronisation pulse so that each transformation operation is aligned with the start of the OFDM symbol.

The circuit described so far is known from the prior art, with the exception of the phase rotator 15. The present invention is directed, inter alia, to a novel and inventive technique for use in the symbol synchronisation circuit 20.

Figure 2:
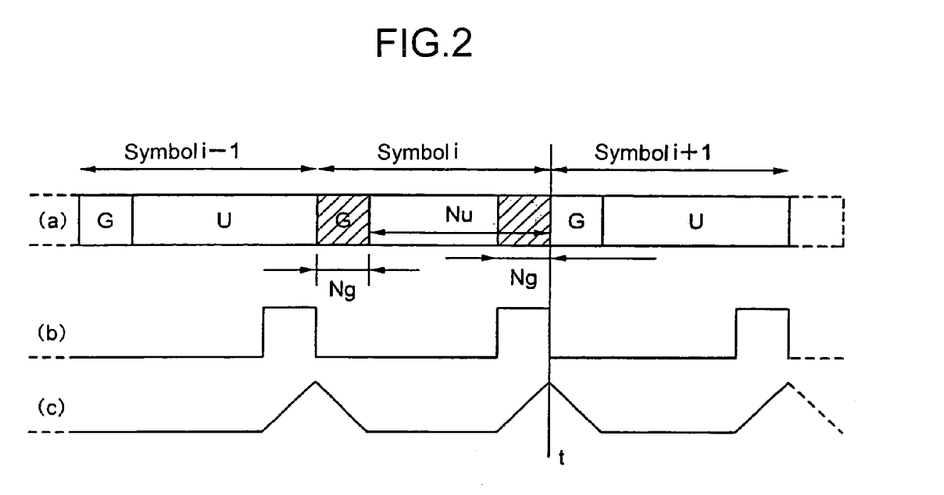
FIG. 2 schematically represents an OFDM signal.

Referring to FIG. 2(a), it is assumed that an OFDM symbol consists of Nu+Ng samples, representing Nu samples in the useful part U of the signal, preceded by Ng samples in the guard space G. The Ng samples in the guard space G contain the same data as the last Ng samples of the useful part U of the symbol (as indicated, in respect of one of the symbols, by hatching).

Figure 3:
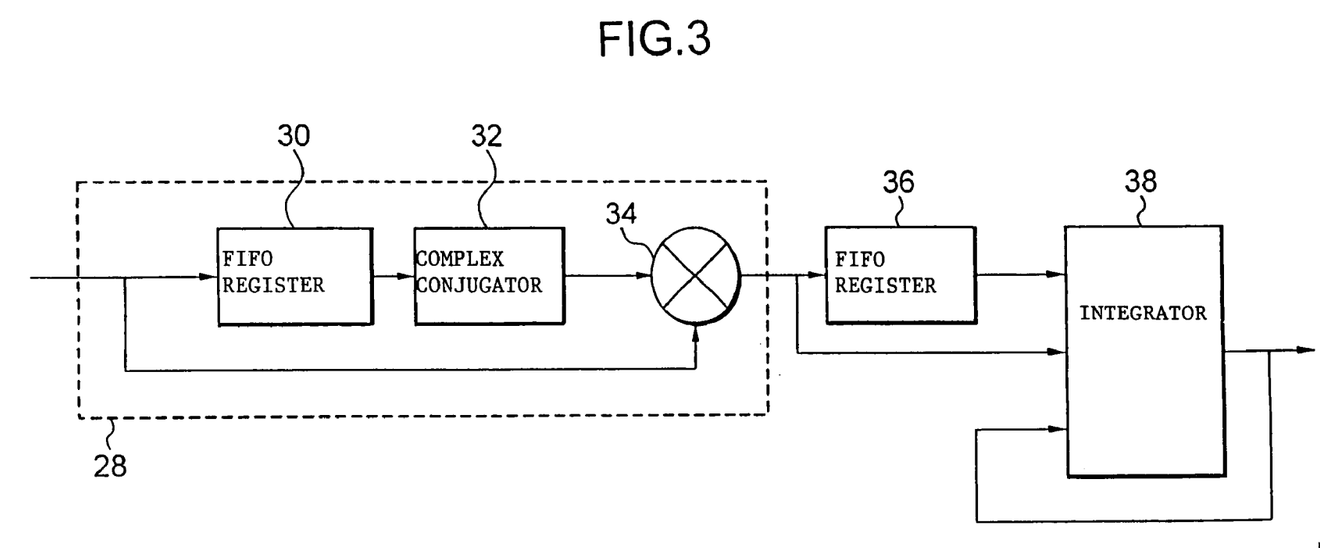
FIG. 3 is a block diagram of a prior art arrangement for generating a synchronisation pulse.

Referring to FIG. 3, in a prior art synchronisation circuit, the complex samples from the IF-to-baseband converter 8 are provided in succession to a first-in first-out (FIFO) register 30 of a cross-correlator 28. This register contains Nu stages, so that it provides a corresponding delay of Nu samples. The output of the register 30 is provided to a complex conjugator circuit 32 of the correlator 28, which converts each sample into its complex conjugate. Then, at a multiplier 34 of the correlator 28, each complex conjugate is multiplied by an undelayed sample from the A/D converter 10. (Alternatively, the complex conjugator 32 can be inserted into the other path to the multiplier 34.)

Whenever the complex conjugates of the delayed samples in the guard space G are multiplied by the samples of equal value derived from the end of the succeeding useful part U of the symbol, the correlator output will be high. At other times, the correlator output will adopt a random value. FIG. 2(*b*) represents the output of the correlator. For clarity, FIG. 2(*b*) represents an ideal output after averaging over a number of symbols, although in practice the averaging can occur at a later stage.

The output of the correlator 28 is provided to another FIFO register 36, this register containing Ng locations. An integrator 38 receives the output of the FIFO register 36 as well as, directly, the output of the correlator 28. The integrator serves to add each new sample to the current integrator output and subtract the sample received Ng samples earlier. Thus, the output represents the sum of the most recent Ng samples. The output is represented at FIG. 2(*c*). It will be noted that this output gradually increases towards the end of each symbol, and then immediately starts decreasing. A peak detector (not shown) produces a timing signal whenever the integrator output reaches a peak (for example as shown at timing t in FIG. 2). This is used as the synchronisation pulse for the FFT 14, and it will be noted that it will appear at the end of each symbol, i.e. exactly when the most recent Nu samples received in the FIFO register 36 are the appropriate ones for use by the FFT 14.

The FFT operates on the Nu samples of the useful part U of the signal. It will be appreciated from FIG. 2 that the synchronisation signal t could be provided at any time within the last Ng samples of a symbol (i.e. whenever the FIG. 2(*b*) waveform is at a high level), and still avoid ISI, because the provision of the guard space G means that the preceding Nu samples will be from the same signal.

Figure 4:
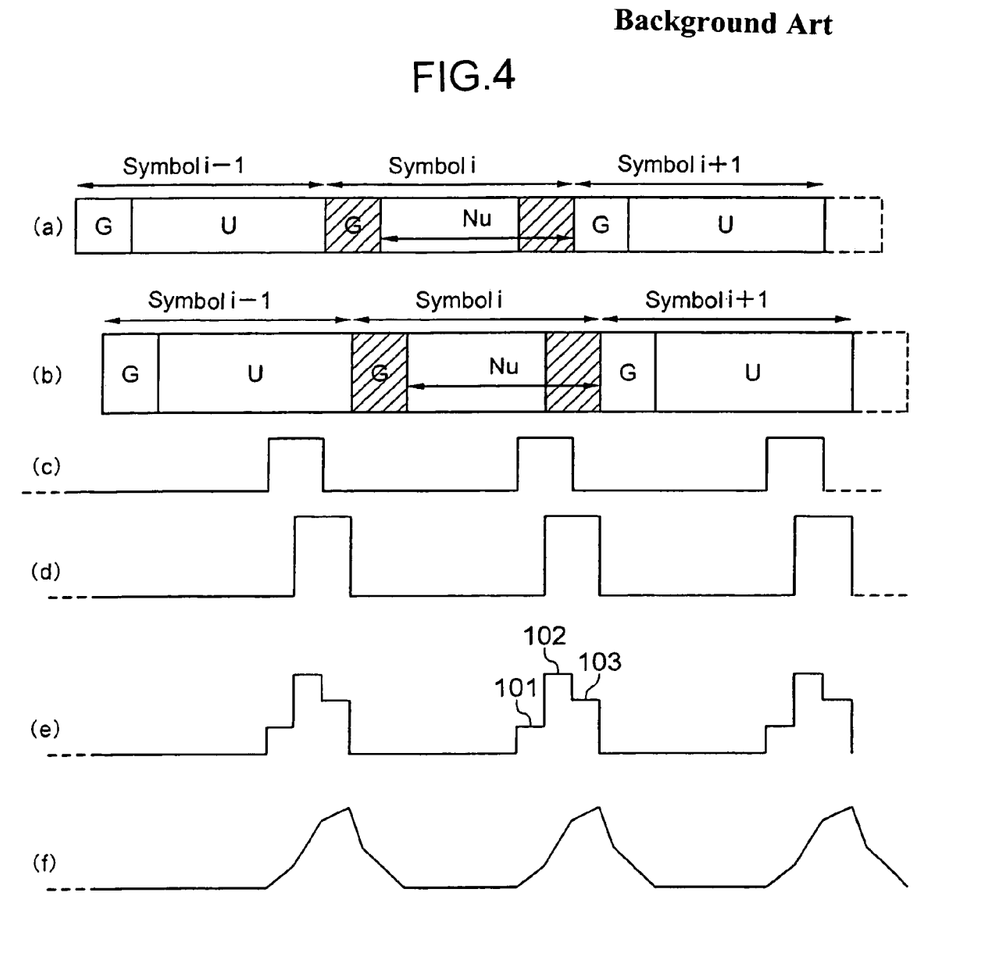
FIG. 4 schematically represents the effects of multi-path interference on the cross-correlation output.

FIG. 4 shows one possible effect of multi-path interference. FIGS. 4(*a*) and 4(*b*) show the same signal, received at different times, FIG. 4(*a*) representing the weaker of the signals, which in this case is received first.

FIG. 4(*c*) represents the output which the correlator of FIG. 3 would provide in the absence of the FIG. 4(*b*) signal, and FIG. 4(*d*) shows the output which the correlator would provide in the absence of the signal of FIG. 4(*a*). With both signals present, the correlator produces an output represented at FIG. 4(*e*). (Again, FIGS. 4(*c*) to 4(*e*) represent correlator outputs averaged over a plurality of symbols.)

The waveform in FIG. 4(*e*) has three sections, 101, 102 and 103. These sections collectively represent an interval during which the correlator output is at a high-level due to significant correlation between values separated by Nu samples in one or both of the signals. The highest correlation, in sub-interval 102, occurs when positive correlations result from both signals. It will be noted that section 102 is the only part of the waveform in which the last Ng samples of a symbol from signal 4(*a*) occur at the same time as the last Ng samples of a symbol of signal 4(*b*). Accordingly, sub-interval 2 is the only period in which a timing signal can be provided while avoiding ISI.

However, if the correlator output were to be integrated by the prior art circuit of FIG. 3, the output would be represented by FIG. 4(*f*). The peak of this output occurs at the end of section 3, which means that it would be too late. In particular, this means that although the FFT 14 would process only samples from symbol i of the FIG. 4(*b*) signal, it would additionally process samples from symbol i+1 of the signal of FIG. 4(*a*).

Figure 5:
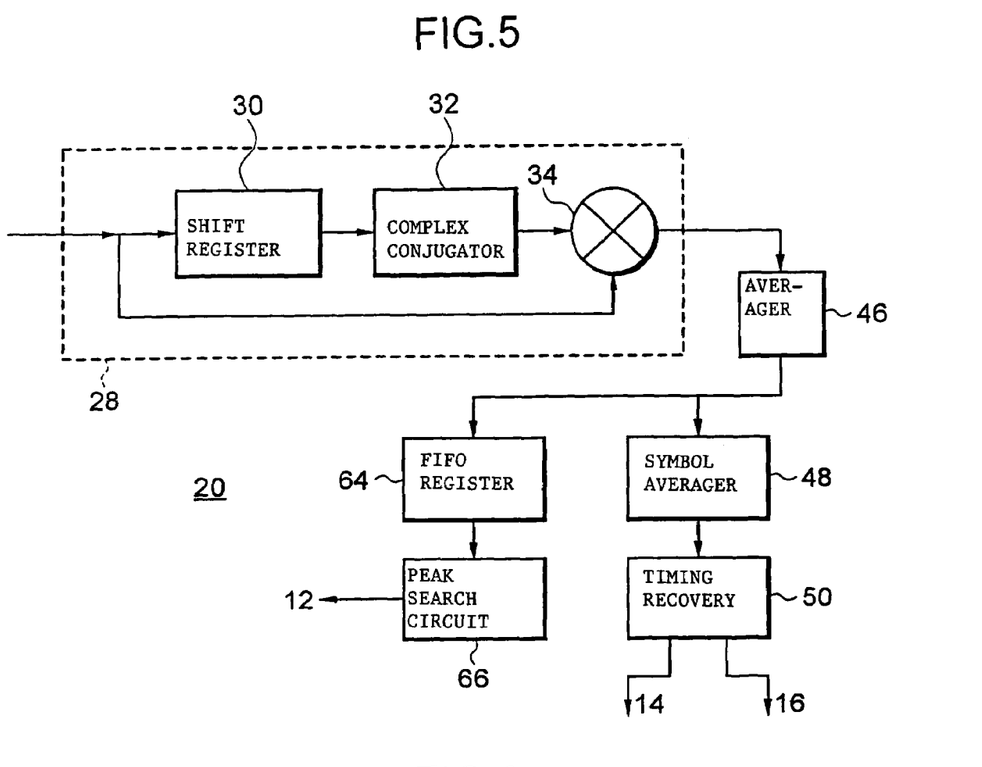
FIG. 5 is a block diagram of a synchronisation circuit of the present invention.

Referring to FIG. 5, the synchronisation circuit 20 of the present embodiment of the invention comprises a correlator 28 formed by shift register 30, complex conjugator 32 and multiplier 34, as in the prior art arrangement of FIG. 3. The output of the correlator 28 is delivered to an averager 46, which can also be an FIFO register as in the prior art arrangement of FIG. 3, but in this case the number of stages is equal to L1, which is significantly less than Ng. The output of the FIFO 46 is delivered to a symbol averager 48, which sums each sample from FIFO 46 with the corresponding samples from the preceding Ns symbols. Accordingly, the output of the symbol averager is equal to the correlator output averaged over L1 samples and Ns symbols. In the case of multi-path interference as shown in FIG. 4, the output will be similar to the waveform shown in FIG. 4(*e*), with slight smoothing resulting from the L1 averaging.

This output is then delivered to a timing recovery circuit 50. This provides the synchronisation signal to the FFT 14.

Figure 6:
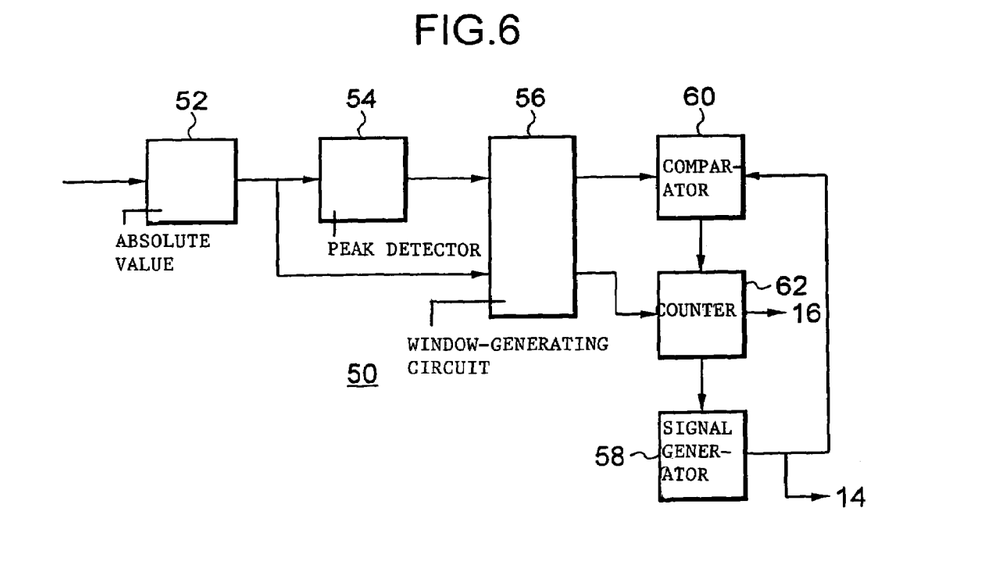
FIG. 6 is a block diagram of a timing recovery circuit forming part of the synchronisation circuit.
Figure 7:
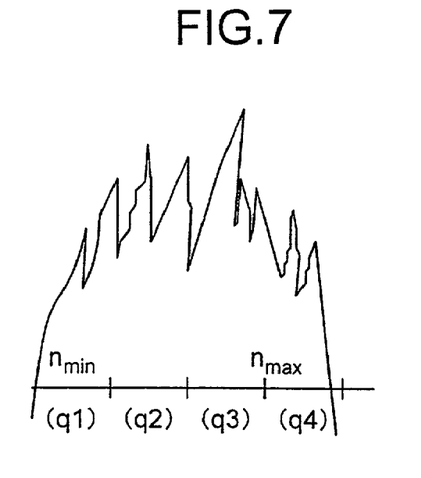
FIG. 7 represents part of a typical waveform derived from the correlation output, this part occupying a sub-interval within which a synchronisation pulse can be optimally generated.

The functions performed by the timing recovery circuit 50 are illustrated schematically by the blocks in FIG. 6. The output samples from the symbol averager 48 are delivered to an absolute value circuit 52. This calculates the absolute value for each sample, i.e. $\sqrt{(x^2+y^2)}$, where x and y are the in-phase and quadrature components of the sample. These are checked in a peak detector 54 which determines the value of the sample with the largest magnitude. A window generating circuit 56 responds to the samples from the absolute value circuit 52 and the peak value detected by the circuit 54 to determine the nearest samples on either side of the peak that are below a threshold which is equal to 0.75 times the peak value. The window generator 56 will therefore detect a range of samples, from $n_{min}$ to $n_{max}$ which represents the largest degree of correlation in the signal from the correlator. FIG. 7 represents a typical waveform representing the samples from the symbol averager 48 during this period. Timing signals generated during the period $n_{min}$ to $n_{max}$ are likely to be suitable for avoiding ISI.

A synchronisation signal generator 58 generates a synchronisation pulse once per symbol, following an initialisation operation described below.

A comparator 60 compares the time at which this timing signal is generated with the range of sample values $n_{min}$ to $n_{max}$ determined by the window generator 56. If there is a significant difference, a value stored in a counter circuit 62 is altered. When one of several values stored in the counter circuit 62 reaches a predetermined threshold, a signal is sent to the signal generator 58 to adjust the timing of the synchronisation signal by an amount which depends upon the range $n_{min}$ to $n_{max}$ calculated by the window generator 56. The arrangement is such that the timing signal will tend to be generated about midway between the samples $n_{min}$ and $n_{max}$, but that it will only be adjusted if there are persistent and/or significant errors in the current timing signal.

In this embodiment, the comparator 60 divides the range $n_{min}$ to $n_{max}$ into four quarters, q1, q2, q3 and q4, in order of increasing sample number, as shown in FIG. 7. If the comparator 60 determines that the current timing of the synchronisation pulse lies in q1, then a first, "early" register in counter 62 is incremented by one. If the timing signal is found to lie in q4, then a second, "late" register is incremented by one. If the timing lies in q2 or q3, then both counters are decremented by one, although they are not allowed to go below zero. If at any time either counter reaches the value 4, then the counter circuit 62 causes the timing pulse generated by signal generator 58 to be shifted by an amount corresponding to $(n_{max}-n_{min})/4$ rounded to the nearest four samples, for the next symbol (or for a predetermined later symbol, for example the second or third succeeding symbol, to allow more time for the further processing described below). The timing pulse is moved forward or backwards depending upon whether it is the early or late counter which has reached the value 4.

A further register of counter circuit 62 is incremented or decremented depending on whether the timing lies outside the range $n_{min}$ to $n_{max}$. If this occurs over four successive periods, the counter circuit 62 causes an initialisation operation.

This initialisation operation, which would occur when re-tuning to a new station or after power-on, results in the signal generator 58 being set to generate the timing signal at a position midway between $n_{min}$ and $n_{max}$. The initialisation operation also involves effecting changes to filter characteristics, as described below.

Whenever the signal generator 58 is caused to shift the timing of the synchronisation pulse, this will result in differential phase rotation of the carriers at the output of the FFT 14. To facilitate the handling of this, the counter circuit 62 of the timing recovery circuit 50 outputs a signal representing the amount of change applied to the synchronisation pulse, which signal is received by the phase rotator 15. The phase rotator 15 contains a look-up table storing pre-computed phase rotations corresponding to the possible values represented by the signal from the timing recovery circuit 50. Accordingly, upon receipt of this signal, the appropriate values are derived from the look-up table and the respective complex samples in the FFT output are adjusted by corresponding amounts. As an alternative, the phase rotator 15 can have means for computing the phase rotations in response to the signal from the timing recovery circuit 50. It will be noted that phase adjustment is facilitated because:
 (a) the timing recovery circuit 50 produces a signal representative of the amount of adjustment of the synchronisation pulse;
 (b) the timing recovery circuit is arranged, as described above, such that adjustments occur relatively infrequently;
 (c) the amount of adjustment of the synchronisation pulse is rounded, which reduces the number of different possible adjustments applied to the timing of the synchronisation pulse;
 (d) the timing recovery circuit is capable of specifying in advance the first symbol to be affected by the change in timing of the synchronisation pulse;
 (e) because timing adjustment is performed only after the timing recovery circuit 50 has detected a succession of timing errors of a similar nature, it is possible if desired for the determination of appropriate phase rotations to be carried out in advance, for example when only one or two symbols have been determined to have timing errors, to allow even more time for the operation; and
 (f) the changes to be applied can be pre-computed and stored in the look-up table.

Referring again to FIG. 5, the output of the FIFO register 46 is also delivered to a further FIFO register 64, which acts as a sliding-window averager summing successive groups of L2 samples. The sampling rate is divided by L1, and the L2 most recent samples are summed. Preferably, L1×L2 is substantially equal to Ng. The combination of these two averagers, 46 and 64, is functionally equivalent to the conventional averager 36 in the prior art circuit of FIG. 3. The output of the averager 64 is presented to a peak search circuit 66, which finds the sample with the largest magnitude and derives the angle of this sample, which provides an estimate of the fine frequency deviation. A signal representing this frequency offset is then provided to the frequency correction circuit 12 which corrects the frequency by phase rotation of the received samples.

In this embodiment, the L2 averager 66 averages successive values within a symbol, but alternatively the averaging could be performed over corresponding values in successive symbols (although this would delay the provision of an accurate fine frequency estimate).

Upon powering-up of the receiver, or when tuning to a new station, it is desirable to lock on to a new signal as soon as possible. This process preferably begins with the first received symbol. In this case, the value Ns, i.e. the number of symbols taken into account by the symbol averager 48, would start at 1, and would therefore increase for each newly-received symbol, although preferably the value would not be allowed to increase beyond a relatively small number (e.g. 8) so as to avoid too long a period, during which the signal may change, being taken into consideration.

Because Ns starts at a very low value and then increases, it is desirable to have the values L1 and L2 vary during this initial stage. L1 preferably starts at a relatively high value (although still preferably substantially smaller than Ng) because otherwise with low values of Ns the output of the L1 averager would be likely to be excessively erratic. Setting L1 equal to, for example, 64 while Ns equals one would provide a good first timing estimate for the synchronisation signal from the first symbol. If L1 is initially set relatively high, then preferably L2 is set correspondingly low to compensate.

Figure 8:
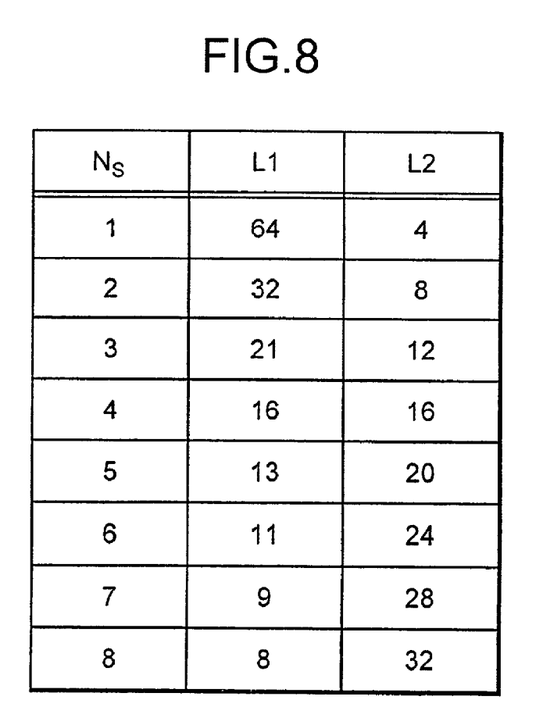
FIG. 8 represents how the three values of Ns, L1 and L2 may vary.

A table of FIG. 8 represents an example of how these values may vary.

The values for the 9th and succeeding symbols remain at the values for the 8th symbol.

It will be appreciated that the present invention is effective not only in simple multi-path interference such as that described in connection with FIG. 4, but also in other situations where signals are received via more than two paths. In these circumstances, the waveform of FIG. 4(e) would be a more complex staircase waveform. However, so long as the spread of delay is such that there is a period in which all the guard spaces overlap, the techniques of the invention can be used to determine a corresponding window in which the synchronisation signal should be generated.

It is to be noted that, although reference has been made to the period in which there is overlap of the guard spaces, which are at the beginning of the symbols, as in the embodiment described above this is not necessarily the correct time to generate the synchronisation signal; in the embodiment above, there is a corresponding period, in the overlap of the duplicated data, when the signal should be issued. The choice of the appropriate interval will depend upon a number of factors, such as whether the guard space is considered to be at the beginning or the end of the signal, and whether (as in the above embodiment) the timing signal is used to define the end of a symbol period, rather than the beginning. It is to be further noted that the description set out above disregards the delays which may occur, for example in the FIFO averager 46. In the embodiment described above, in practice, it is appropriate to make a correction corresponding to −(L1)/2 samples to account for this delay.

The above embodiment correlates samples spaced by Nu sample periods by means of multiplying one sample with the complex conjugate of the other sample. Other arrangements are possible. For example, the correlator could operate by taking the difference between the absolute values of samples separated by Nu sample periods, as described in our co-pending UK patent application no. BPA9920446.3(agent's reference J00041703 GB).

The invention has been described in the context of an OFDM receiver, in which the synchronisation pulse is used to define the window of samples on which a Fast Fourier Transformation is performed. However, the invention is also useful in other circumstances in which there is a need for a synchronisation pulse representing the symbol boundaries; for example, such a pulse would be valuable in a repeater where full FFT demodulation is not performed.

The functional elements described herein can be implemented either in dedicated hardware or in software.

INDUSTRIAL APPLICABILITY

As has been described, the method of generating a synchronisation pulse representing a symbol boundary in an OFDM signal according to this invention comprising useful symbol periods separated by guard spaces, with data in each guard space corresponding to part of the data in a respective useful period, the method comprising a step of providing a signal representing the degree of correlation between samples of a received signal which are separated by a period corresponding to the useful part of the symbol, the signal thus providing an output representing for each symbol an interval during which significant correlation is found, and a step of determining a sub-interval within which a maximum degree of correlation occurs and arranging for the synchronisation pulse to be provided within this sub-interval. Therefore, the processing time including acquisition time can be shortened and the processing power can be decreased while still avoiding the inter-symbol-interference (ISI).

The invention claimed is:

1. A method of generating a synchronisation pulse representing a symbol boundary in an OFDM signal comprising useful symbol periods separated by guard spaces, with data in each guard space corresponding to part of the data in a respective useful period, the method comprising
   providing a signal representing the degree of correlation between samples of a received signal which are separated by a period corresponding to the useful part of the symbol, the signal thus providing an output representing for each symbol an interval during which significant correlation is found, the method comprising
   determining respective degrees of correlation in each of plural sub-intervals within said interval,
   detecting a sub-interval within which a maximum degree of correlation occurs, and
   providing a synchronisation pulse within the detected sub-interval.

2. A method as claimed in claim 1, wherein the detected sub-interval is determined by applying a threshold to the signal representing the degree of correlation.

3. A method as claimed in claim 2, wherein the threshold is varied.

4. A method as claimed in claim 3, wherein the threshold represents a value which is dependent upon the maximum value of the signal representing the degree of correlation.

5. A method as claimed in claim 1, in which the signal representing the degree of correlation is subject to filtering prior to using the signal to determine said detected sub-interval, the filtering being such that each filtered output sample represents, substantially, an average of a predetermined number of successive samples, said predetermined number being substantially less than the number of samples within a guard space.

6. A method as claimed in claim 5, in which the filtered output represents values averaged over a plurality of symbols.

7. A method as claimed in claim 6, in which the number of symbols over which the filtered output values are averaged increases during an acquisition stage, and in which the filtering is adjusted during that acquisition stage so as to decrease the number of successive samples, the average of which is represented by each filtered output sample.

8. A method as claimed in claim 5, wherein the filtered output is subjected to further filtering before being processed to provide a signal representing a fine frequency offset.

9. A method as claimed in claim 1, including the step of adjusting the timing of the synchronisation pulse only if a calculated error in the current timing exceeds a predetermined threshold.

10. A method as claimed in claim 1, including the step of adjusting the timing of the synchronisation pulse only if the current timing is determined to be in error over a predetermined number of symbol periods, the predetermined number of symbol periods being greater than one.

11. A method as claimed in claim 1, wherein the timing of the synchronisation pulse is adjusted in predetermined quantities corresponding to a plurality of sample periods.

12. A method of generating a synchronisation pulse representing a symbol boundary in an OFDM signal comprising useful symbol periods separated by guard spaces, with data in each guard space corresponding to part of the data in a respective useful period, the method including:
   calculating an error in the current timing;
   comparing the magnitude of the calculated error with a predetermined threshold; and
   adjusting the timing of the synchronisation pulse when the magnitude of the calculated error in the current timing exceeds said predetermined threshold.

13. A method of generating a synchronisation pulse representing a symbol boundary in an OFDM signal comprising useful symbol periods separated by guard spaces, with data in each guard space corresponding to part of the data in a respective useful period, the method including the step of (i) counting the number of symbol periods over which the current timing is determined to be in error, and (ii) adjusting the timing of the synchronisation pulse in response to the counted symbol periods exceeding a predetermined number greater than one, wherein the error in the current timing is calculated by comparing a timing signal with a range of values corresponding to a sub-interval, said sub-interval being detected by determining respective degrees of correlation in each of plural sub-intervals within a correlation interval within which significant correlation occurs, and detecting said sub-interval within which a maximum degree of correlation occurs.

14. A method as claimed in claim 13, wherein the timing of the synchronisation pulse is adjusted in response to the current timing having an error exceeding a predetermined threshold over said predetermined number of symbol periods.

15. A method of generating a synchronisation pulse representing a symbol boundary in an OFDM signal, said signal comprising symbols, each symbol being formed of successive complex samples, each of said successive complex samples having a sample period, and each symbol including useful symbol periods, said useful symbol periods being separated by guard spaces, with data in each guard space corresponding to part of the data in a respective useful symbol period, the method including:

changing the timing of the synchronisation pulse by a predetermined adjustment quantity, said predetermined adjustment quantity being calculated by a rounding operation so that said predetermined adjustment quantity is equal to a plurality of sample periods.

16. A method as claimed in claim 12, wherein the timing of the synchronisation pulse is adjusted in predetermined quantities corresponding to a plurality of sample periods.

17. A method of receiving an OFDM signal, the method including the step of generating a synchronisation pulse using a method as claimed in any one of claims 1, 12, 13 and 15, and using the synchronisation pulse in order to apply a Fast Fourier Transform to complex samples derived from the OFDM signal.

18. A method according to claim 17, the method further including the step of providing, when the timing of the synchronisation pulse is altered, a signal representing the degree of alteration, and applying to the transformed samples phase rotations determined by this signal.

19. A method as claimed in claim 18, wherein the phase rotations are determined by values in a look-up table addressed in accordance with the signal representing the degree of alteration of the synchronisation pulse timing.

20. A method of receiving an OFDM signal, the method including:

generating a synchronisation pulse and using the synchronisation pulse in order to apply, in a FFT unit, a Fast Fourier Transform to complex samples derived from the OFDM signal;

providing, once the timing of the synchronisation pulse is altered, a signal representing the degree of alteration to a phase rotation unit; and applying, to the transformed samples received from the FFT, phase rotations determined based on the signal.

21. A method as claimed in claim 20, wherein the phase rotations are determined by values in a look-up table addressed in accordance with the signal representing the degree of alteration of the synchronisation pulse timing.

22. Apparatus for generating a synchronising pulse, the apparatus operating according to a method as claimed in claim 1.

23. An OFDM receiver arranged to operate in accordance with a method according to claim 17.

24. A method of generating a synchronisation pulse representing a symbol boundary in an OFDM signal comprising useful symbol periods separated by guard spaces, with data in each guard space corresponding to part of the data in a respective useful period, the method including the steps of:

adjusting the timing of the synchronisation pulse in predetermined quantities corresponding to a plurality of sample periods, receiving an OFDM signal, by generating the synchronisation pulse, using the synchronisation pulse in order to apply a Fast Fourier Transform to complex samples derived from the OFDM signal in a FFT unit, providing to a phase rotation unit, once the timing of the synchronisation pulse is altered, a signal representing the degree of alteration, and applying, to the transformed samples received from the FFT unit, phase rotations determined based on the signal.

25. A method as claimed in claim 24, wherein the phase rotations are determined by values in a look-up table addressed in accordance with the signal representing the degree of alteration of the synchronisation pulse timing.

* * * * *

UNITED STATES PATENT AND TRADEMARK OFFICE
CERTIFICATE OF CORRECTION

PATENT NO.         : 7,227,834 B1                                                Page 1 of 1
APPLICATION NO.    : 09/807959
DATED              : June 5, 2007
INVENTOR(S)        : Stephen K. Barton et al.

It is certified that error appears in the above-identified patent and that said Letters Patent is hereby corrected as shown below:

On the title page, Item (73), the Assignee information is incorrect. Item (73) should read:

-- (73)  Assignee: Mitsubishi Denki Kabushiki Kaisha, Tokyo (JP) --

Signed and Sealed this

Seventeenth Day of February, 2009

JOHN DOLL
*Acting Director of the United States Patent and Trademark Office*